US008169762B2

(12) United States Patent
Baxter et al.

(10) Patent No.: US 8,169,762 B2

(45) Date of Patent: May 1, 2012

(54) RELAY WITH CURRENT TRANSFORMER

(75) Inventors: Jeffrey Baxter, Hillsboro, OR (US); Brent Baxter, Hillsboro, OR (US); Michael Baxter, Hillsboro, OR (US); Ted Holbrook, Gresham, OR (US)

(73) Assignee: Energy Safe Technologies, Inc., Great Neck, NY (US)

( * ) Notice: Subject to any disclaimer, the term of this patent is extended or adjusted under 35 U.S.C. 154(b) by 425 days.

(21) Appl. No.: 12/426,866

(22) Filed: Apr. 20, 2009

(65) Prior Publication Data

US 2010/0265630 A1 Oct. 21, 2010

(51) Int. Cl.
*H02H 3/08* (2006.01)

(52) U.S. Cl. .......... 361/93.1; 361/93.6; 361/38; 361/36; 361/160; 361/204

(58) Field of Classification Search ................. 361/93.1, 361/93.6, 38, 36, 35, 160, 187, 204
See application file for complete search history.

(56) References Cited

U.S. PATENT DOCUMENTS

| | | | | |
|---|---|---|---|---|
| 2,195,650 | A * | 4/1940 | Hardy | 431/29 |
| 2,620,464 | A * | 12/1952 | Hunter et al. | 318/490 |
| 3,365,686 | A * | 1/1968 | Petersen | 336/150 |
| 4,211,934 | A | 7/1980 | Henle et al. | |
| 4,387,306 | A * | 6/1983 | Sibley | 307/125 |
| 4,453,109 | A | 6/1984 | Stupp et al. | |
| 4,456,943 | A | 6/1984 | Judy | |
| 4,502,086 | A | 2/1985 | Ebisaka | |
| 4,772,870 | A | 9/1988 | Reyes | |
| 4,833,564 | A | 5/1989 | Pardue et al. | |
| 5,004,954 | A * | 4/1991 | Kleven et al. | 315/106 |
| 5,277,244 | A | 1/1994 | Mehta | |
| 5,361,184 | A | 11/1994 | El-Sharkawi et al. | |
| 5,426,698 | A * | 6/1995 | Reymond | 379/399.01 |
| 5,701,109 | A * | 12/1997 | Poulsen | 335/78 |
| 5,705,237 | A * | 1/1998 | Andersen et al. | 428/34.4 |
| 5,872,499 | A | 2/1999 | Poulsen | |
| 6,339,320 | B1 | 1/2002 | Spemo et al. | |
| 6,795,282 | B2 | 9/2004 | Neumuller et al. | |
| 7,212,090 | B2 * | 5/2007 | Kadah | 335/78 |
| 2007/0230076 | A1 | 10/2007 | Husband et al. | |
| 2008/0116896 | A1 | 5/2008 | Skinner | |
| 2008/0164768 | A1 | 7/2008 | Litwack | |
| 2008/0239606 | A1 | 10/2008 | Holce et al. | |

FOREIGN PATENT DOCUMENTS

| | | |
|---|---|---|
| GB | 807903 | 1/1959 |
| KR | 20040028238 | 4/2004 |
| KR | 20010055864 | 7/2011 |
| TW | 249174 | 2/2006 |

* cited by examiner

*Primary Examiner* — Patrick Salce

(74) *Attorney, Agent, or Firm* — Michael F. Krieger; Adam D. Stevens; Kirton McConkie

(57) ABSTRACT

Current transformer relays having dual functions as current transformers and electromechanical switches are described. The current transformer relay includes a relay coil and a conducting loop concentric with the relay coil. Additional functions are thus provided in addition to the main relay switching function or functions. The concentric nature of the relay coil and the conducting loop create a current transformer between these elements. The additional functions include the ability to measure an alternating current (AC) current conducted by the conducting loop, the ability to detect and interpret an information signal imposed on power lines connected to the conducting loop, the ability to induce or impose an information signal on the conducting loop for transmission to power lies connected to the conducting loop, and the ability to measure a differential current between currents carried by the conducting loop and a second concentric conducting loop.

19 Claims, 4 Drawing Sheets

RELAY WITH CURRENT TRANSFORMER

BACKGROUND OF THE INVENTION

1. Field of the Invention

The present invention relates to electrical relays and more particularly to electrical relays including one or more conducting loops concentric with a relay coil to cause the relay to concurrently serve as a current transformer.

2. Background and Related Art

In a common direct current (DC) operated relay, a direct current flowing through a relay coil magnetizes an iron (or other ferromagnetic) yoke assembly that causes the state of the switch to change. When the coil current is removed, a mechanical spring returns the switch to its original position. The relay on a car's starter motor is one example of such a relay. Other examples are found in many automotive and household applications.

Latching relays change state when their coil current is pulsed briefly, after which the switch remains in the new state. The coil is energized only while the relay changes state. This latching action is important when it is desirable to eliminate the power consumption that would otherwise occur if the coil were powered continuously. In some latching relay designs a brief relay coil current flowing in the reverse direction will return the switch to its original position. Other latching relay designs cause their switch to toggle between states when activated by a second current pulse of the same polarity, or even without regard to the polarity of the coil current.

While the use of relays in various electrical circuits is common, the function of the relay and relay components has traditionally been limited to the switching functions of the relay. Additionally, relays may be somewhat bulky, and in modern microelectronics may represent one of the larger or largest components of some circuits. Therefore, traditional relays are limited by their limited functionality in combination with their size requirements.

BRIEF SUMMARY OF THE INVENTION

Implementation of the invention provides a current transformer relay having dual functions as both a current transformer and an electromechanical switch. The current transformer relay includes a first relay coil surrounding a ferromagnetic core and a first conducting loop concentric with the first relay coil. The first relay coil and the ferromagnetic (e.g. soft iron) core are essentially similar to existing to existing relay coils and cores, and serve at least similar functions to their comparative relay components.

However, the first relay coil serves one or more additional functions not currently provided by existing relays in addition to the main switching function or functions. The additional functions are provided in conjunction with the first conducting loop concentric with the first relay coil. The concentric nature of the first relay coil and the conducting loop create a current transformer between these elements, and this allows the additional functions to be realized. The additional functions include the ability to measure an alternating (AC) current conducted by the first conducting loop, the ability to detect and interpret an information signal imposed on power lines connected to the first conducting loop, the ability to induce or impose an information signal on the first conducting loop for transmission to power lies connected to the first conducting loop, and the ability to measure a differential current between currents carried by the first conducting loop and a second conducting loop.

The first conducting loop serves as an essentially single-turn primary winding of a current transformer formed by the first conducting loop, the first relay coil, and the core (and other ferromagnetic relay components such as a yoke and an armature). Additionally and alternatively, the first conducing loop serves as an essentially single-turn secondary winding of the current transformer, depending on the point of view with respect to the use of the current transformer. When first the conducting loop conducts an AC current (such as supplied by an AC power source through the conducting loop to a load), the AC current flowing around the first conducting loop induces an alternating magnetic field in the relay ferromagnetic components, which in turn induces a proportional AC current in the first relay coil. The AC current induced in the first relay coil can be used and measured to determine the AC current conducted by the first conducting loop using a current measurement circuit.

Similarly, the current transformer formed by the first conducting loop and the first relay can be used to measure more than one frequency of AC current in the first conducting loop. Therefore, if one AC frequency is used to provide power (typically a first, lower frequency), and a second AC frequency is used to carry information content, a current-measuring circuit attached to the first relay coil can be used to detect and interpret information contained in and conveyed by the second AC frequency. Signals conveyed and detected in this manner can include analog and digital signals using amplitude modulation, frequency modulation, phase modulation, or any other modulation or encoding scheme.

In similar fashion, when the first conducting loop serves as an essentially single-turn secondary winding of the current transformer, a signal-generating circuit attached to the first relay coil can be used to impose an AC information signal on the first relay coil. The AC current flowing around the first relay coil induces an alternating magnetic field in the relay ferromagnetic components, which in turn induces a proportional AC information signal in the first conductive loop. The information signal induced in the first conductive loop propagates through any connected wires, such as AC voltage supply wires, and can be detected by other components attached to the connected wires (such as in a whole-home automation system or the like). Thus, the current transformer relay can be used as a communications device for communicating over AC power distribution wiring in addition to providing relay switching functions.

The current transformer relay can alternatively be used to detect and measure a differential current between the first conducting loop and a second conducting loop that is also concentric with the first relay coil and with the first conducting loop. Similarly, in a current transformer relay used in a multi-phase situation, more than two conducting loops may be present and the current transformer relay can be used to detect and measure a nonzero sum of currents among the various conducting loops. In the two-conducting-loop example, if a first AC current conducted in one direction by the first conducting loop does not equal a second AC current conducted in the opposite direction by the second conducting loop (such as due to a ground fault condition), the difference in currents will induce an alternating magnetic field in the relay ferromagnetic components, which in turn induces a proportional AC current in the first relay coil. This proportional AC current can be detected and utilized to shut off the AC currents, such as by activating the relay itself by way of the first relay coil.

One drawback to transformer performance in a standard relay arrangement is that it is somewhat sensitive to ambient magnetic fields. To solve this problem, the relay actuation coil can be distributed between each piece of the ferromagnetic structure of the relay to approximate the magnetic structure of a toroid. In this example of the current transformer relay, the relay actuation coil is distributed between the first relay coil about the ferromagnetic core and a second relay coil concentric with a yoke of the relay. In this example, the conductive loop is concentric with only the first relay coil, and therefore passes between the first relay coil and the second relay coil.

Implementation of the invention as discussed herein can simplify the manufacturing process for devices requiring a switching relay and an AC current measuring capability and/or a communication capability, as multiple capabilities may be obtained with the installation of only a single device. Otherwise, without the current transformer relay, it may be necessary to install a separate relay and a separate AC current transformer. Parts costs and assembly costs are therefore reduced using implementation of the invention. Additionally, implementations of the invention save space that would otherwise be required for a separate AC current transformer. Elimination of the additional space of the separate AC current transformer increases design freedom, speeds up assembly, and simplifies inspection and testing. Similarly, reliability is improved by way of reduction of the parts count.

Therefore, implementation of the invention may include a first relay coil and a first conducting loop concentric with the first relay coil, may include first and second relay coils and a first conducting loop concentric with the first relay coil, may include a first relay coil and first and second conducting loops concentric with the first relay coil, may include a first relay coil and more than two conducting loops concentric with the first relay coil, or may include first and second relay coils with one or more conducting loops concentric with the first relay coil. Each conductive loop may form a single winding of the current transformer formed by the conductive loop or loops and the first relay coil. Implementation of the invention may also include various additional circuits connected to the first relay coil, including one or more relay control circuits, which may be similar to or identical to such circuits commonly incorporated into existing relays, and one or more non-control circuits including one or more current measurement circuits, one or more signal detection and interpretation circuits, and/or one or more signal generator circuits.

Implementation of the invention may provide a current transformer relay in a variety of devices. Non-limiting examples of devices in which current transformer relays as described herein may be incorporated include household or industrial wiring devices, such as power safe outlets, devices incorporating a ground fault circuit interrupter (GFCI), switches, circuit breakers, and the like, pieces of household or industrial equipment having a power supply, power supply cords and cables, such as extension cords and power strips, and industrial and consumer devices where communications capabilities over AC power supply lines is desired. One example of such a situation is a whole-home automation system. Other examples where current transformer relays as described herein may be incorporated include any other situation where relays are used and either AC power is present or an AC communications mechanism can be used, which may include relays in vehicles or nearly any other situation where a relay is desired.

Implementation of the invention can be achieved essentially without affecting the standard switching function of current relays. Therefore, implementation of the invention can take place with any of a variety of relay types, including relays activated by direct current (DC); relays activated by AC; latching relays; non-latching relays; normally-open relays; normally-closed relays; single pole single throw relays; single pole double throw relays; double pole single throw relays; double pole double throw relays; multiple pole single throw relays; and multiple pole double throw relays.

BRIEF DESCRIPTION OF THE SEVERAL VIEWS OF THE DRAWINGS

The objects and features of the present invention will become more fully apparent from the following description and appended claims, taken in conjunction with the accompanying drawings. Understanding that these drawings depict only typical embodiments of the invention and are, therefore, not to be considered limiting of its scope, the invention will be described and explained with additional specificity and detail through the use of the accompanying drawings in which:

DETAILED DESCRIPTION OF THE INVENTION

Figure 1:
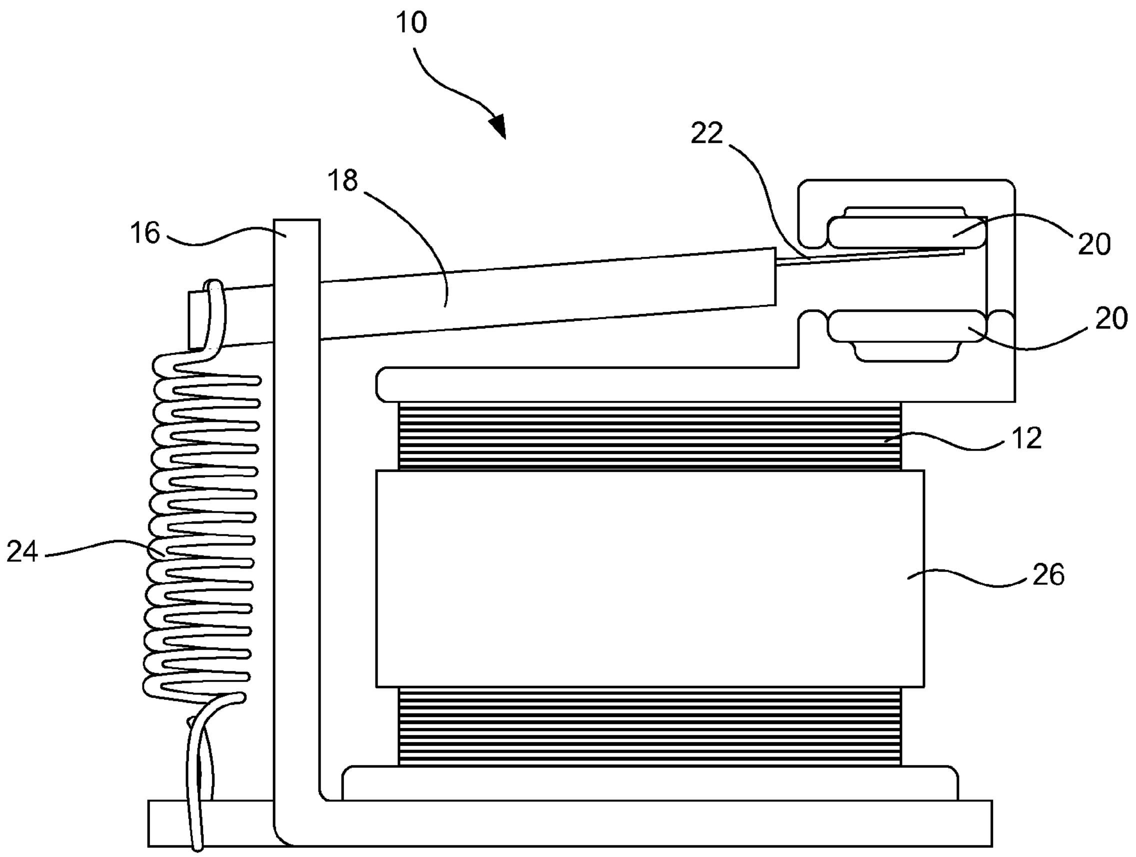
FIG. 1 shows a simplified perspective view of one embodiment of a current transformer relay.

A description of embodiments of the present invention will now be given with reference to the Figures, where elements of the embodiments of the invention have been depicted, albeit not necessarily to scale. It is expected that the present invention may take many other forms and shapes, hence the following disclosure is intended to be illustrative and not limiting, and the scope of the invention should be determined by reference to the appended claims.

Embodiments of the invention provide a current transformer relay having dual functions as both a current transformer and an electromechanical switch. The current transformer relay includes a first relay coil surrounding a ferromagnetic core and a first conducting loop concentric with the first relay coil. The first relay coil and the ferromagnetic (e.g. soft iron) core are essentially similar to existing to the relay coils and cores of existing relays, and serve at least similar functions to their comparative relay components.

However, the first relay coil serves one or more additional functions not currently provided by existing relays in addition to the main switching function or functions. The additional functions are provided in conjunction with the first conducting loop concentric with the first relay coil. The concentric nature of the first relay coil and the conducting loop create a current transformer between these elements, and this allows the additional functions to be realized. The additional functions include the ability to measure an alternating current (AC) current conducted by the first conducting loop, the ability to detect and interpret an information signal imposed on power lines connected to the first conducting loop, the ability to induce or impose an information signal on the first conducting loop for transmission to power lies connected to the first conducting loop, and the ability to measure a differential current between currents carried by the first conducting loop and a second conducting loop.

The first conducting loop serves as an essentially single-turn primary winding of a current transformer formed by the first conducting loop, the first relay coil, and the core (and other ferromagnetic relay components such as a yoke and an armature). Additionally and alternatively, the first conducing loop serves as an essentially single-turn secondary winding of the current transformer, depending on the point of view with respect to the use of the current transformer. When first the conducting loop conducts an AC current (such as supplied by an AC power source through the conducting loop to a load), the AC current flowing around the first conducting loop induces an alternating magnetic field in the relay ferromagnetic components, which in turn induces a proportional AC current in the first relay coil. The AC current induced in the first relay coil can be used and measured to determine the AC current conducted by the first conducting loop using a current measurement circuit.

Similarly, the current transformer formed by the first conducting loop and the first relay can be used to measure more than one frequency of AC current in the first conducting loop. Therefore, if one AC frequency is used to provide power (typically a first, lower frequency), and a second AC frequency is used to carry information content, a current-measuring circuit attached to the first relay coil can be used to detect and interpret information contained in and conveyed by the second AC frequency. Signals conveyed and detected in this manner can include analog and digital signals using amplitude modulation, frequency modulation, phase modulation, or any other modulation or encoding scheme.

In similar fashion, when the first conducting loop serves as an essentially single-turn secondary winding of the current transformer, a signal-generating circuit attached to the first relay coil can be used to impose an AC information signal on the first relay coil. The AC current flowing around the first relay coil induces an alternating magnetic field in the relay ferromagnetic components, which in turn induces a proportional AC information signal in the first conductive loop. The information signal induced in the first conductive loop propagates through any connected wires, such as AC voltage supply wires, and can be detected by other components attached to the connected wires (such as in a whole-home automation system or the like). Thus, the current transformer relay can be used as a communications device for communicating over AC power distribution wiring in addition to providing relay switching functions.

The current transformer relay can alternatively be used to detect and measure a differential current between the first conducting loop and a second conducting loop that is also concentric with the first relay coil and with the first conducting loop. Similarly, in a current transformer relay used in a multi-phase situation, more than two conducting loops may be present and the current transformer relay can be used to detect and measure a nonzero sum of currents among the various conducting loops. In the two-conducting-loop example, if a first AC current conducted in one direction by the first conducting loop does not equal a second AC current conducted in the opposite direction by the second conducting loop (such as due to a ground fault condition), the difference in currents will induce an alternating magnetic field in the relay ferromagnetic components, which in turn induces a proportional AC current in the first relay coil. This proportional AC current can be detected and utilized to shut off the AC currents, such as by activating the relay itself by way of the first relay coil.

One drawback to transformer performance in a standard relay arrangement is that it is somewhat sensitive to ambient magnetic fields. To solve this problem, the relay actuation coil can be distributed between each piece of the ferromagnetic structure of the relay to approximate the magnetic structure of a toroid. In this example of the current transformer relay, the relay actuation coil is distributed between the first relay coil about the ferromagnetic core and a second relay coil concentric with a yoke of the relay. In this example, the conductive loop is concentric with only the first relay coil, and therefore passes between the first relay coil and the second relay coil.

Embodiments of the invention as discussed herein can simplify the manufacturing process for devices requiring a switching relay and an AC current measuring capability and/or a communication capability, as multiple capabilities may be obtained with the installation of only a single device. Otherwise, without the current transformer relay, it may be necessary to install a separate relay and a separate AC current transformer. Parts costs and assembly costs are therefore reduced using embodiments of the invention. Additionally, embodiments of the invention save space that would otherwise be required for a separate AC current transformer. Elimination of the additional space of the separate AC current transformer increases design freedom, speeds up assembly, and simplifies inspection and testing. Similarly, reliability is improved by way of reduction of the parts count.

Therefore, embodiments of the invention may include a first relay coil and a first conducting loop concentric with the first relay coil, may include first and second relay coils and a first conducting loop concentric with the first relay coil, may include a first relay coil and first and second conducting loops concentric with the first relay coil, may include a first relay coil and more than two conducting loops concentric with the first relay coil, or may include first and second relay coils with one or more conducting loops concentric with the first relay coil. Each conductive loop may form a single winding of the current transformer formed by the conductive loop or loops and the first relay coil. Embodiments of the invention may also include various additional circuits connected to the first relay coil, including one or more relay control circuits, which may be similar to or identical to such circuits commonly incorporated into existing relays, and one or more non-control circuits including one or more current measurement circuits, one or more signal detection and interpretation circuits, and/or one or more signal generator circuits.

Embodiments of the invention may provide a current transformer relay in a variety of devices. Non-limiting examples of devices in which current transformer relays as described herein may be incorporated include household or industrial wiring devices, such as power safe outlets, devices incorporating a ground fault circuit interrupter (GFCI), switches, circuit breakers, and the like, pieces of household or industrial equipment having a power supply, power supply cords and cables, such as extension cords and power strips, and industrial and consumer devices where communications capabilities over AC power supply lines is desired. One example of such a situation is a whole-home automation system. Other examples where current transformer relays as described herein may be incorporated include any other situation where relays are used and either AC power is present or an AC communications mechanism can be used, which may include relays in vehicles or nearly any other situation where a relay is desired.

Embodiments of the invention can be provided essentially without affecting the standard switching function of current relays. Therefore, embodiments of the invention can be provided in conjunction with any of a variety of relay types, including relays activated by direct current (DC); relays activated by AC; latching relays; non-latching relays; normally-open relays; normally-closed relays; single pole single throw relays; single pole double throw relays; double pole single throw relays; double pole double throw relays; multiple pole single throw relays; and multiple pole double throw relays.

FIG. 1 illustrates one embodiment of a current transformer relay 10. Some details of the current transformer relay 10 shown in FIG. 1 and the remaining Figures have been omitted for clarity of illustration. For example, one or more wires between various contacts of the current transformer relay 10 are not shown, and a backing for the current transformer relay 10 is also not shown. Similarly, any surrounding components or additional circuitry is not shown, although embodiments of the invention are discussed with relation to such components and circuitry. As the types and implementation of such circuitry and components will be readily appreciated by one of skill in the electrical arts without specific illustration of such circuitry and components, such illustration has been omitted in favor of clarity of illustration of the current transforming relay 10.

The relay switching functions of the current transformer relay 10 shown in FIG. 1 are essentially provided by an adaptation of an electromagnet. The current transformer relay 10 includes a first relay coil 12 surrounding a ferromagnetic core 14 (not visible in FIG. 1, but shown in FIGS. 2-4). The current transformer relay 10 also includes a ferromagnetic yoke 16 and a movable ferromagnetic armature 18. The core 14, yoke 16, and armature 18 provide a low-reluctance path for magnetic flux induced by current passing through the first relay coil 12. As is known in the art, not all ferromagnetic materials are commonly used for these relay components. Instead, commonly used materials include soft iron and specialized relay steels such as defined by ASTM A867-03 Standard Specification for Iron-Silicon Relay Steels by ASTM International (2008). All references herein to ferromagnetic relay components should be interpreted as referring to components manufactured from relay-compatible materials such as soft iron or iron-silicon relay steels as defined by ASTM A867-03 or the like.

The current transformer relay 10 shown in FIG. 1 also includes a pair of contacts 20. One or the other of the contacts 20 are contacted by a contact portion 22 of the armature 18. Although two contacts 20 are illustrated in FIG. 1, it will be readily understood that more or fewer contacts 20 may be provided. The armature 18 is hingedly connected to the yoke 16 (and may also be electrically connected to the yoke by a wire (not shown)), and in the absence of a relay-switching signal through the first relay coil 12, is normally held in the position illustrated in FIG. 1 by a spring 24. Thus, in the de-energized condition illustrated in FIG. 1, one of the contacts is closed, and the other is open. As discussed above, alternate embodiments may have only a single contact that is either closed or open in the de-energized condition, or may have more sets of contacts.

When an electric current is passed through the first relay coil 12, a magnetic field is created in the ferromagnetic components of the current transformer relay 10, thereby attracting the armature 18 in the direction of the first relay coil 12 (downward in FIG. 1), and the consequent movement of the contact portion 22 makes and/or breaks a connection with one or more fixed contacts 20. If the set of contacts 20 was closed when the first relay coil 12 was de-energized, then the movement opens the set of contacts 20 and breaks the connection and vice-versa if the set of contacts 20 were open. When the current to the first relay coil 12 is switched off, the armature 18 is returned by a force to its relaxed position by the spring 24. In other current transformer relays 10, the return force may be provided gravity or some other force. In the current transformer relay 10, the return force provided by the spring 24 is less than the magnetically-generated actuation force provided by the current passing through the first relay coil 12.

Although the relay-switching features of current transformer relays 10 have been discussed with respect to an illustrative embodiment in FIG. 1, it should be appreciated that embodiments of the invention can be practiced with a variety of relay types, and that the relay-switching features of such current transformer relays can vary according to the incorporated relay type. For example, one of skill in the art will readily appreciate that such features can be varied depending on the number and types of contacts 20, whether the relay is configured to be operated by AC or DC current through the first relay coil 12, whether the relay is a non-latching relay configured to be switched between a relaxed state and an energized state or one of a variety of latching relays configured to be switched between states. For example, in some latching relays, a brief current flowing in the reverse direction in the first relay coil 12 causes the switch to return to its original position, while in other latching relays, the switch is toggled between states when activated by a current pulse of the same polarity or even without regard to the polarity of the coil current. In many applications, it is desirable to utilize latching relay types to reduce energy usage of the relay, and embodiments of the invention are designed to work provide such benefits by incorporating latching relay features. Thus, it is anticipated that embodiments of the invention may be practiced with any of a variety of electromechanical relay types and components.

The current transformer relay 10 shown in FIG. 1 includes a feature not present in existing relays, namely a first conducting loop 26. The first conducting loop 26 is generally concentric with the first relay coil 12. The first conducting loop 26 and the first relay coil 12 form a current transformer, and the current transformer can be viewed from one of several points of view. In a first point of view, the current transformer is viewed as having an essentially single-turn primary winding (the first conducting loop 26) and a multiple-turn secondary winding (the first relay coil 12). In a second point of view, the current transformer is viewed as having a multiple-turn primary winding (the first relay coil 12) and an essentially single-turn secondary winding (the first conducting loop 26). These points of view are related to additional functions provided by embodiments of the current transformer relay.

The first conducting loop 26 is configured to carry AC currents, which often are relatively high-current AC currents, such as supply-line AC currents. For example, when the current transformer relay 10 is incorporated into a consumer wiring device, such as a power safe outlet configured to interrupt power supply to the outlet when an unsafe condition is detected, the first conducting loop 26 is configured to be electrically connected at one end to one of the incoming supply lines (e.g. hot or common) immediately or soon after the incoming supply line enters the wiring device. The other end of the first conducting loop 26 is then electrically connected to the other internal components of the wiring device where the supplied AC power is to be used. In this fashion, any current passing through the wiring device passes through the first conducting loop 26, thereby making substantially one turn around the first relay coil 12.

Because the first relay coil 12 and the first conducting loop 26 form a current transformer, the passage of AC currents through the first conducting loop 26 can be measured using the first relay coil 12 in a first additional function provided by the current transformer relay. An AC current flowing around the first conducting loop 26 induces an alternating magnetic field in the ferromagnetic components of the relay (e.g. the core 14 and the yoke 16), which induces a corresponding and proportional alternating current in the first relay coil. The induced current in the first relay coil can readily be measured using a current measurement circuit or device of any type now known in the art or later invented, and one of skill in the art will readily appreciate the many types of current measurement circuits or devices that can be used. Thus, with the first conducting loop 26 acting as a primary of the transformer and the first relay coil 12 acting as a secondary of the transformer, the amount of current flowing in the first conducting loop 26 can be determined.

Information determined about the amount of current flowing in the first conducting loop 26 can be used for a variety of purposes. For example, the current measurements can be used to determine energy usage of a device incorporating the current transformer relay 10 or can be used to determine energy usage of a device plugged into a power safe outlet incorporating the current transformer relay 10. Alternatively or additionally, if an over-current event is determined (such as due to a short circuit), a device incorporating the current transformer relay 10 can respond by interrupting the power flow, such as by activating or de-activating/de-energizing the relay incorporated in the current transformer relay 10 (e.g. the first relay coil 12).

Alternatively or additionally and as one example only, in the case of a power safe outlet, it may be desirable to interrupt supply to the output terminals of the outlet except when it has been determined that a safe load is connected to the output terminals and has been turned on. This behavior provides safety such as in the event that a child tries to insert a metal object into one or more of the output terminals of the power safe outlet; the output terminals are de-energized and are not energized upon such an event as the outlet determines that an unsafe condition exists. This type of outlet behavior and systems and methods for achieving it is described in U.S. Pat. No. 7,505,237 to Michael Baxter (a co-inventor of the instant application), which patent is incorporated herein by specific reference for all it discloses. To achieve the described behavior, it is desirable to shut off the power to the output terminals when the output current drops below a certain amount (e.g. when the load attached to the outlet is shut off or unplugged). This shut-off behavior is easily achieved by the current transformer relay 10, as the current in the first conducting loop 26 can be measured and when the current drops below the desired value, the switching relay functions of the current transformer relay 10 activated to shut off the power.

One additional current measurement function that may be achieved by the current transformer relay 10 is the measurement of additional AC currents through the first conducting loop 26. For example, while a supply voltage is commonly supplied through electrical supply lines at a relatively fixed voltage and frequency, the electrical supply lines can concurrently carry signals at other AC frequencies. This capability is commonly exploited to impose communications signals on the supply lines at other frequencies (commonly higher frequencies) other than the primary supply line frequency. These communications signals can be used to provide whole-home integrated control of a variety of equipment and devices.

The current transformer relay 10 can be configured to measure such signals that pass through the first conducting loop 26 and such signals can then be interpreted to govern behavior of the device. For example, if the current transformer relay 10 is incorporated into a consumer or industrial device, it can receive one or more signals from a remote device configured to control the consumer or industrial device. Such signals may signal the consumer or industrial device to switch on or off or take any of a variety of other actions or functions. When the signals include instructions to switch on or off, the relay-switching functions of the current transformer relay 10 may be utilized to provide the on/off switching function. Similarly, an outlet, light switch, or other consumer or industrial wiring device incorporating the current transformer relay 10 can be configured to receive, measure, interpret, and respond to signals transmitted over the electrical supply lines. Thus, the described benefits of measuring the current in the first conducting loop 26 and any other benefits not specifically described herein (such as simplification of components of any systems where current measurement and switching functions are desired) are achieved by the current transformer functions of the current transformer relay 10.

An additional function of the current transformer relay 10 is provided where the first relay coil 12 acts as the primary of the transformer and the first conducting loop 26 acts as the secondary of the transformer. This function is related to the communications capability of the electrical supply wires discussed above. A signal generation circuit or device (of any now-known or later-invented type, as will be appreciated by those skilled in the art) can be electrically connected to the first relay coil 12, and can then be used to superimpose an information signal (e.g. a high-frequency AC signal) on the first conducing loop 26, which then propagates over the connected electrical supply wires, which can then be received and interpreted by a central control unit in another location. The information communicated in this fashion could include any detected localized fault conditions, measured power usage of the device, on/off switching behavior, and the like. Thus, the current transformer relay 10 provides both in-bound and out-bound communications capability to any device in which it is incorporated.

Figure 2:
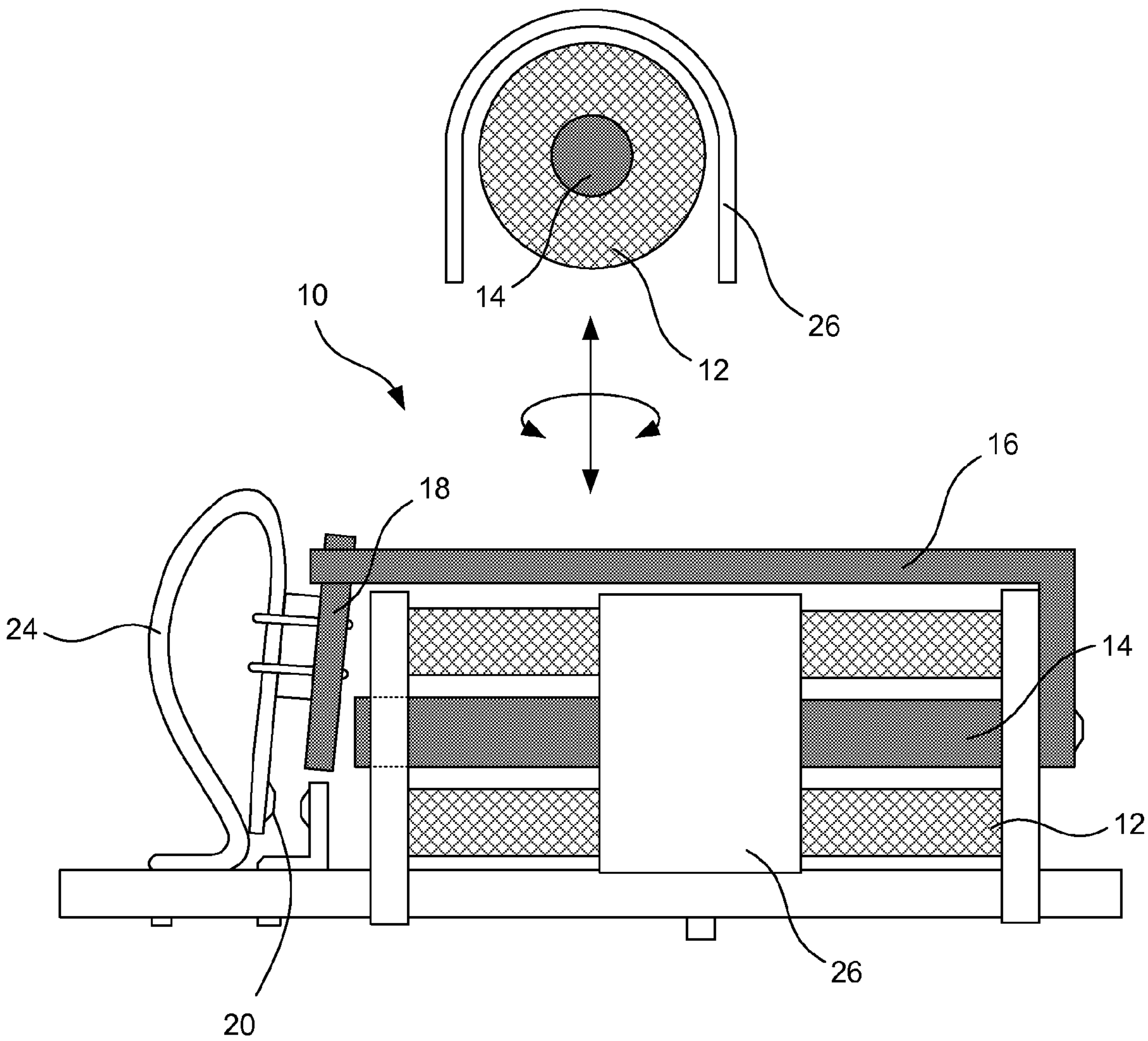
FIG. 2 shows end-on and side plan views of one embodiment of a current transformer relay.
Figure 3:
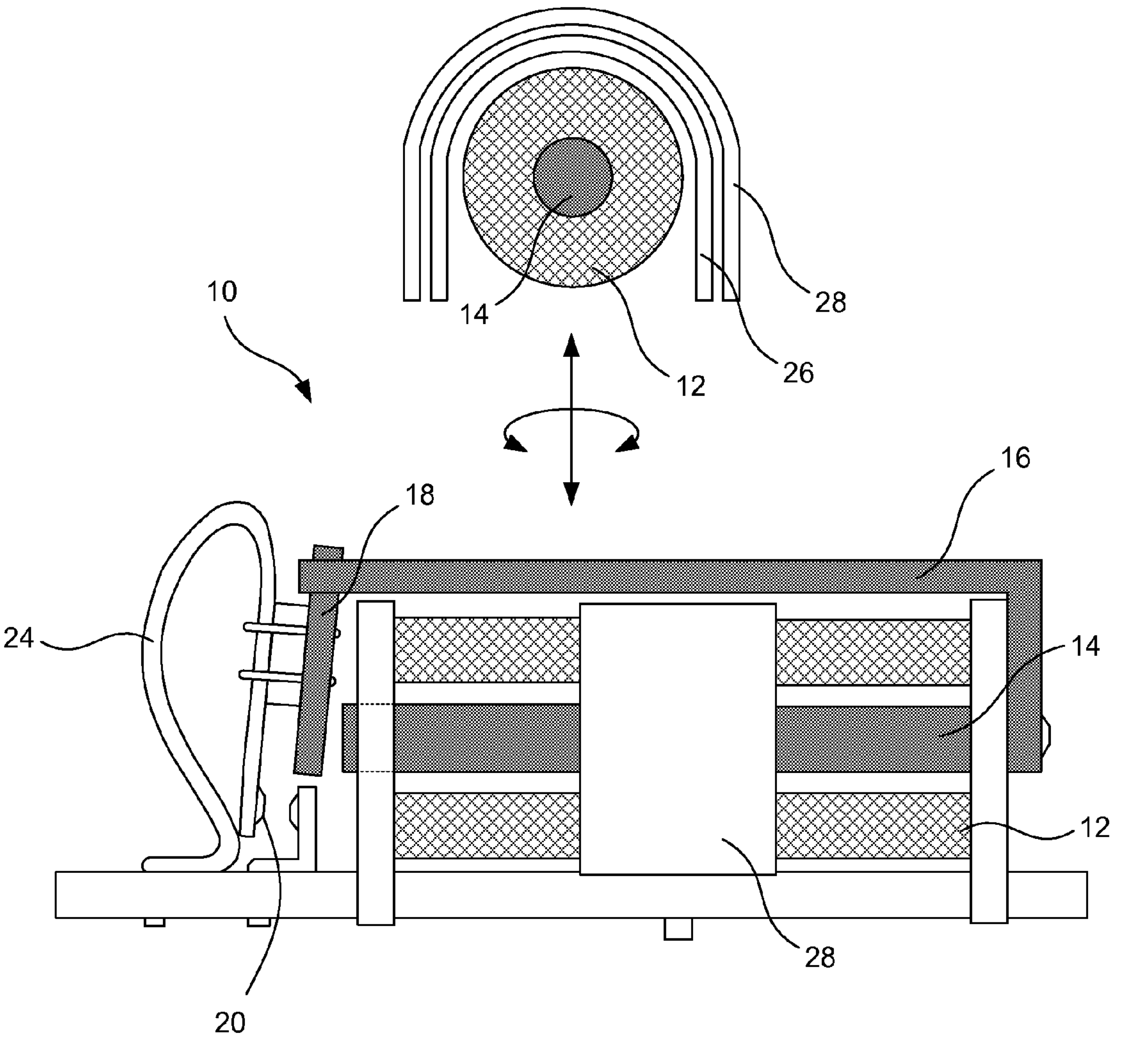
FIG. 3 shows end-on and side plan views of an alternate embodiment of a current transformer relay.
Figure 4:
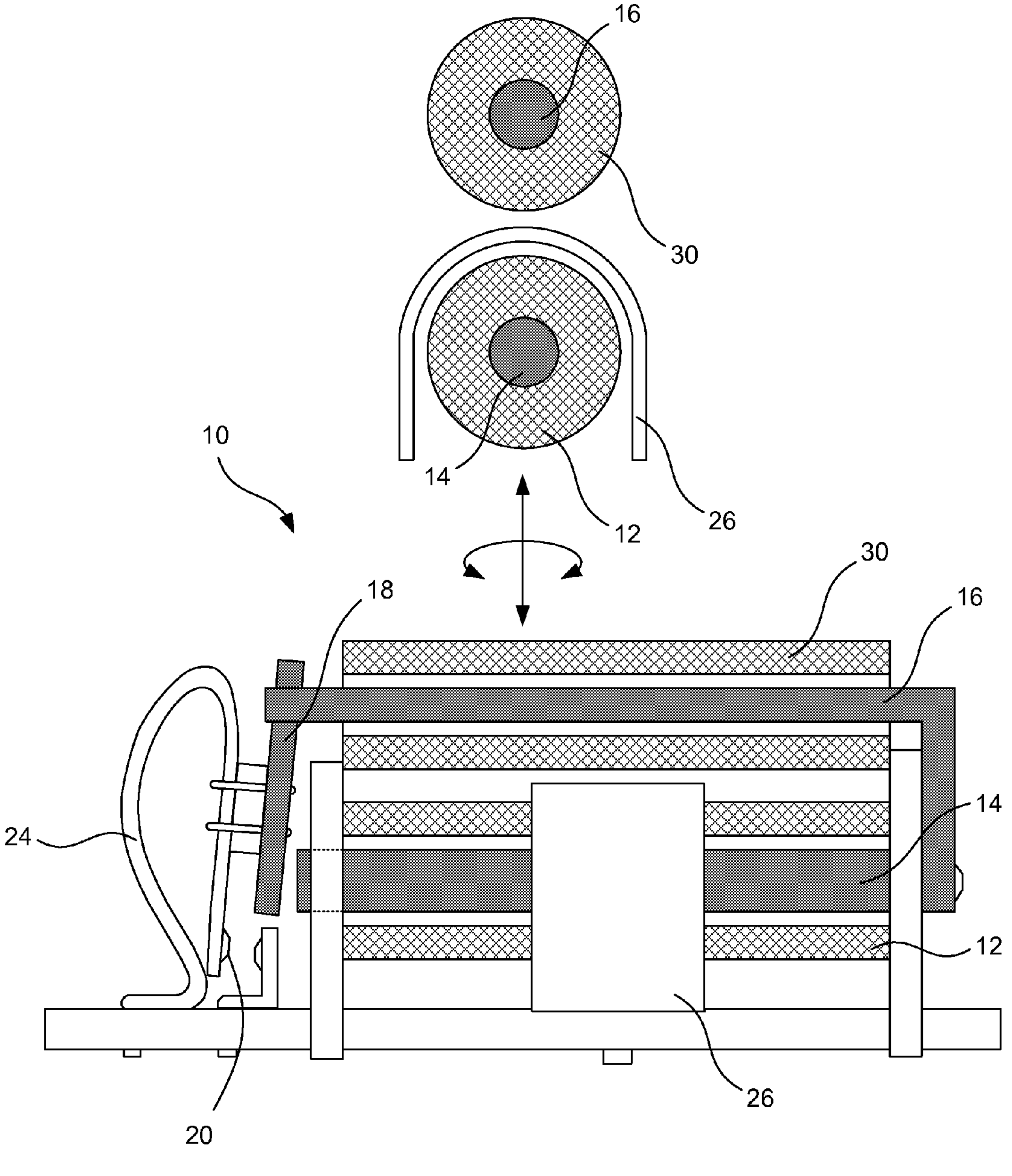
FIG. 4 shows end-on and side plan views of an alternate embodiment of a current transformer relay.

FIGS. 2-4 provide end-on and side simplified plan views of various embodiments of the current transformer relay 10. FIG. 2 shows an alternate conventional solenoid-operated relay similar to the embodiment illustrated in FIG. 1. The end-on view shown in the upper portion of FIG. 2 shows one embodiment of the curved shape of the first conducting loop 26, and how it provides substantially a single turn of the current transformer. Of course, it will be understood that the first conducting loop 26 may extend more or less completely around the first relay coil 12 than shown in FIG. 2. Additionally, although the first conducting loop 26 shown as significantly separated from the first relay coil, it will be understood that the first conducting loop 26 can essentially contact the first relay coil 12 as long as the first relay coil 12 is electrically insulated from the first conducting loop 26.

FIG. 3 shows an alternate embodiment that provides a differential current measuring relay. This embodiment includes a second conducting loop 28. The second conducting loop 28 is essentially concentric with both the first relay coil 12 and the first conducting loop 28, and is electrically insulated from the first relay coil 12 and the first conducting loop 28 against inadvertent physical contact between the various elements. The first conducting loop 26 and the second conducting loop 28 may be electrically connected to two conductors of an electrical supply line (e.g. hot and neutral, respectively, or vice-versa) so that current flowing into a device incorporating the current transformer relay 10 flows in one direction through one of the first conducting loop 26 and the second conducting loop 28 and flows out of the device in an opposite direction through the other of the first conducting loop 26 and the second conducting loop 28.

This provides a differential current measuring relay, as the magnetic field induced in the ferromagnetic components of the relay (e.g. the core 14 and the yoke 16) by the current flowing in the first conducting loop 26 is exactly canceled out by the magnetic field induced in the ferromagnetic components by the current flowing in the opposite direction in the second conducting loop 28 in normal operation. Thus, in normal device operation, the net magnetic flux in the ferromagnetic components of the relay is zero, and no corresponding current is induced in the first relay coil 12. However, where a ground fault condition exists, the current flowing in the second conducting loop 28 is not exactly equal to the current flowing in the first conducting loop 26. Therefore, a non-zero alternating magnetic flux is induced in the ferromagnetic components, which induces a non-zero alternating current in the first relay coil 12. This non-zero current can be detected and measured to determine the existence of a ground fault and/or the severity thereof. As will be appreciated, the differential current measurement relay can therefore be used to provide functions (including switching functions) essentially similar to those provided by a ground fault circuit interrupter (GFCI) or residual-current device. A differential current measuring relay can therefore be used in many devices where such functions are desired.

Although the embodiment of FIG. 3 is shown having two conducting loops, other embodiments can be used in conjunction with multi-phase electrical power. For example, three conducting loops can be used in conjunction with three-phase supplies (three current paths) and four conducting loops can be used in conjunction with three-phase-and-neutral supplies (four current paths). In some cases, it may be necessary to vary the configurations between the various conducting loops to ensure that in the normal state the sum of the induced magnetic fields in the ferromagnetic components is zero, and it is believed that such variation can be determined by way of simple experimentation. Thus, differential current relays of the type illustrated by FIG. 3 can be utilized in a variety of situations where differential current measurement and relay-switching functions are desired.

One drawback to the transformer performance in a standard relay arrangement is that it is somewhat sensitive to ambient magnetic fields. To solve this problem, the relay actuation coil can be distributed between the first relay coil 12 and a second relay coil 30, as depicted in FIG. 4. The second relay coil is substantially concentric with a portion of the yoke 16 so that the distribution of the relay actuation coil between the first relay coil 12 and the second relay coil 30 approximates the magnetic structure of a toroid. This toroidal-approximating structure reduces sensitivity to stray magnetic fields (e.g. noise), thereby providing a noise-canceling relay. In some embodiments, the noise-cancellation features of the noise-canceling relay illustrated in FIG. 4 can be incorporated or provided in conjunction with the differential current measurement features of the differential current relay illustrated in FIG. 3.

Thus, it will be appreciated that embodiments of the invention can simplify the manufacturing process for devices requiring a switching relay and an AC current measuring capability and/or a communications capability, since both capabilities can be obtained with the installation of only a single device. Parts costs and assembly costs are thereby reduced along with parts space requirements. This improves design freedom, speeds up assembly, and simplifies inspection and testing, as well as reliability due to the decreased parts count. It is envisioned that embodiments of the invention can be incorporated in essentially any device in which electromechanical relays can be used, including consumer, industrial, and automotive devices, consumer and industrial wiring devices, and the like.

The present invention may be embodied in other specific forms without departing from its spirit or essential characteristics. The described embodiments are to be considered in all respects only as illustrative and not restrictive. The scope of the invention is, therefore, indicated by the appended claims, rather than by the foregoing description. All changes which come within the meaning and range of equivalency of the claims are to be embraced within their scope.

What is claimed and desired to be secured by Letters Patent is:

1. A current transformer relay having dual functions as a current transformer and an electromechanical switch, the current transformer relay comprising:

a ferromagnetic core;

a first relay coil surrounding the ferromagnetic core whereby a current passed through the first relay coil creates a magnetic field in the ferromagnetic core;

a first conducting loop concentric with the first relay coil; and a second relay coil surrounding a portion of a yoke of the current transformer relay so that the first conducting loop passes between the first relay coil and the second relay coil.

2. A current transformer relay as recited in claim 1, wherein the relay comprises a relay type selected from the group consisting of:

a relay activated by direct current (DC);

a relay activated by alternating current (AC);

a latching relay;

a non-latching relay;

a normally-open relay;

a normally-closed relay;

a single pole single throw relay;

a single pole double throw relay;

a double pole single throw relay;

a double pole double throw relay;

a multiple pole single throw relay; and a multiple pole double throw relay.

3. A current transformer relay as recited in claim 1, wherein the first conducting loop comprises a single winding of the current transformer formed by the first conducting loop and the first relay coil.

4. A current transformer relay as recited in claim 1, wherein the first conducting loop is configured to be electrically connected to an alternating-current (AC) voltage source.

5. A current transformer relay as recited in claim 4, wherein the first relay coil is electrically connected to a current measurement circuit configured to measure a first AC current induced in the first relay coil by a second AC current in the first conducting loop induced by the AC voltage source.

6. A current transformer relay as recited in claim 5, wherein the current measurement circuit is configured to determine a magnitude of the second AC current in the first conducting loop.

7. A current transformer relay as recited in claim 5, wherein the current measurement circuit is configured to detect and interpret an information signal imposed on the second AC current.

8. A current transformer relay as recited in claim 4, wherein the first relay coil is electrically connected to a signal generator circuit configured to induce a first information signal in the first conducting loop by supplying a second information signal to the first relay coil.

9. A current transformer relay as recited in claim 7, whereby when the first conducting loop is electrically connected to the AC voltage source, the first information signal is transmitted over a supply line connecting the AC voltage source to the first conducting loop.

10. A current transformer relay as recited in claim 1, further comprising a second conducting loop concentric with the first relay coil and further concentric with the first conducting loop.

11. A current transformer relay as recited in claim 10, wherein the first conducting loop and the second conducting loop are configured to conduct supply and return electrical current in opposite directions, whereby the first relay coil is configured to serve as a differential current measurement relay.

12. A current transformer relay as recited in claim 11, wherein the current transformer relay is incorporated into a power supply device configured to interrupt a supply of power when a differential current is detected between the first conducting loop and the second conducting loop indicative of a fault condition in a circuit between the first conducting loop and the second conducting loop.

13. A current transformer relay as recited in claim 1, further comprising a second conducting loop concentric with the first relay coil and further concentric with the first conducting loop.

14. A current transformer relay as recited in claim 1, wherein the current transformer relay is incorporated into a power safe outlet.

15. A current transformer relay as recited in claim 1, wherein the current transformer relay provides combined relay and current sensing functions for a piece of industrial equipment.

16. A current transformer relay as recited in claim 1, wherein the current transformer relay is incorporated into a consumer device and provides a transceiver for communicating with an external device over an alternating current (AC) power line connected to the consumer device.

17. A current transformer relay having dual functions as a current transformer and an electromechanical switch, the current transformer relay comprising:

a ferromagnetic core;

a first relay coil surrounding the ferromagnetic core whereby a current passed through the first relay coil creates a magnetic field in the ferromagnetic core, wherein the first relay coil is electrically connected to:

a relay control circuit configured to deliver one or more relay-activating currents to the first relay coil to control switching of the current transformer relay; and a non-control circuit configured to utilize the first relay coil for a purpose other than control of switching of the current transformer relay;

a first conducting loop concentric with the first relay coil; and a second relay coil surrounding a portion of a yoke of the current transformer relay so that the first conducting loop passes between the first relay coil and the second relay coil.

18. A current transformer relay as recited in claim 17, further comprising elements selected from the group consisting of:

a current measurement circuit configured to measure a first AC current induced in the first relay coil by a second AC current in the first conducting loop induced by an AC voltage source connected to the first conducting loop;

a signal generator circuit configured to induce a first information signal in the first conducting loop by supplying a second information signal to the first relay coil;

a second conducting loop concentric with the first relay coil and further concentric with the first conducting loop, wherein the first conducting loop and the second conducting loop are configured to conduct supply and return electrical current in opposite directions, whereby the first relay coil is configured to serve as a differential current measurement relay; and a second relay coil surrounding a portion of a yoke of the current transformer relay so that the current transformer relay approximates a toroidal magnetic structure.

19. A current transformer relay having dual functions as a current transformer and an electromechanical switch, the current transformer relay comprising:

a ferromagnetic core;

a first relay coil surrounding the ferromagnetic core whereby a current passed through the first relay coil creates a magnetic field in the ferromagnetic core, wherein the first relay coil is electrically connected to:

a relay control circuit configured to deliver one or more relay-activating currents to the first relay coil to control switching of the current transformer relay; and a non-control circuit configured to utilize the first relay coil for a purpose other than control of switching of the current transformer relay;

a first conducting loop concentric with the first relay coil and forming, in conjunction with the first relay coil, a substantially single winding of a current transformer; and a second relay coil surrounding a portion of a yoke of the current transformer relay so that the first conducting loop passes between the first relay coil and the second relay coil.

* * * * *